G. W. YOUNGS.
TRANSMISSION GEARING.
APPLICATION FILED OCT. 16, 1920.
1,433,866.
Patented Oct. 31, 1922.
2 SHEETS—SHEET 2.
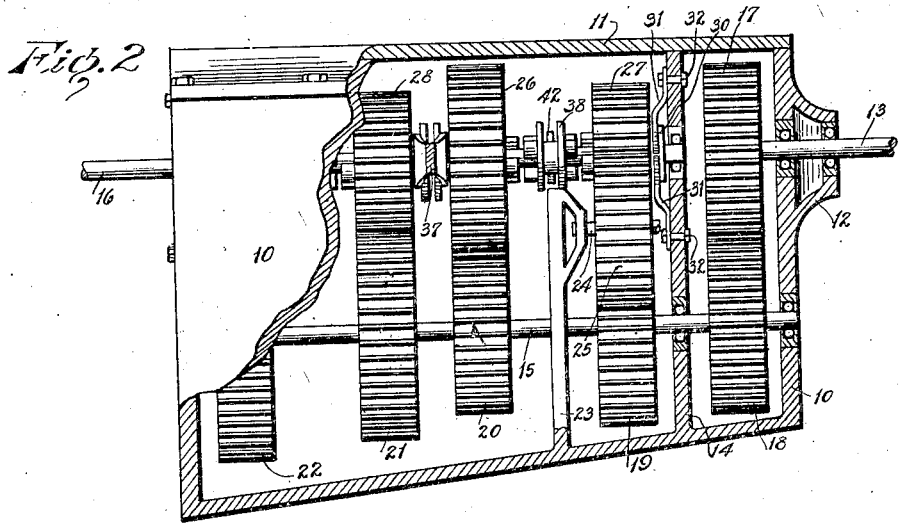
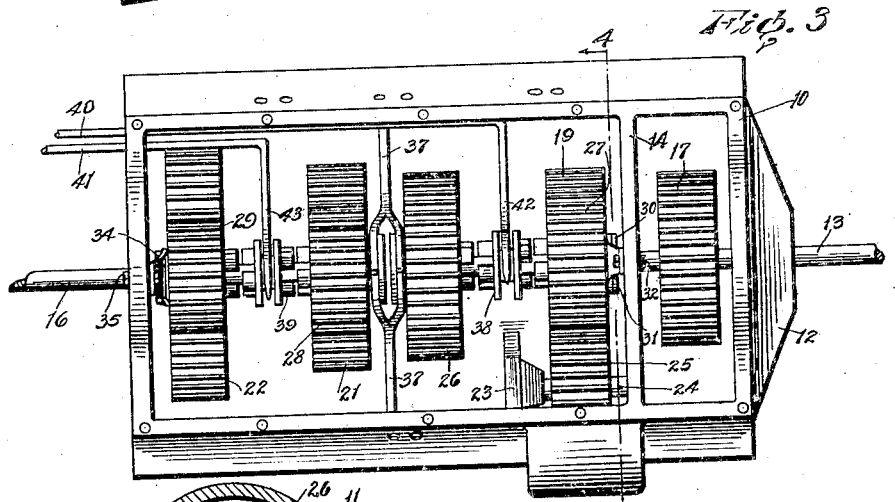
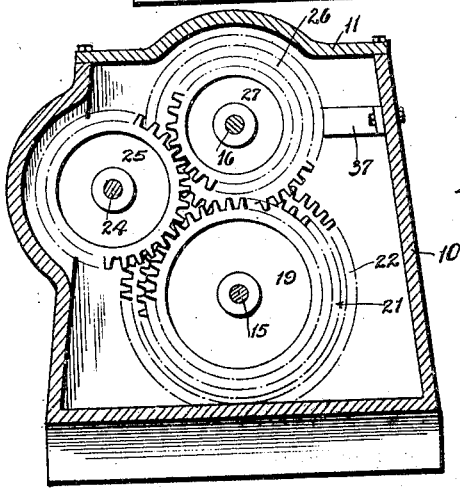
Inventor
G. W. Youngs
By
Lacey & Lacey, Attorneys Patented Oct. 31, 1922.

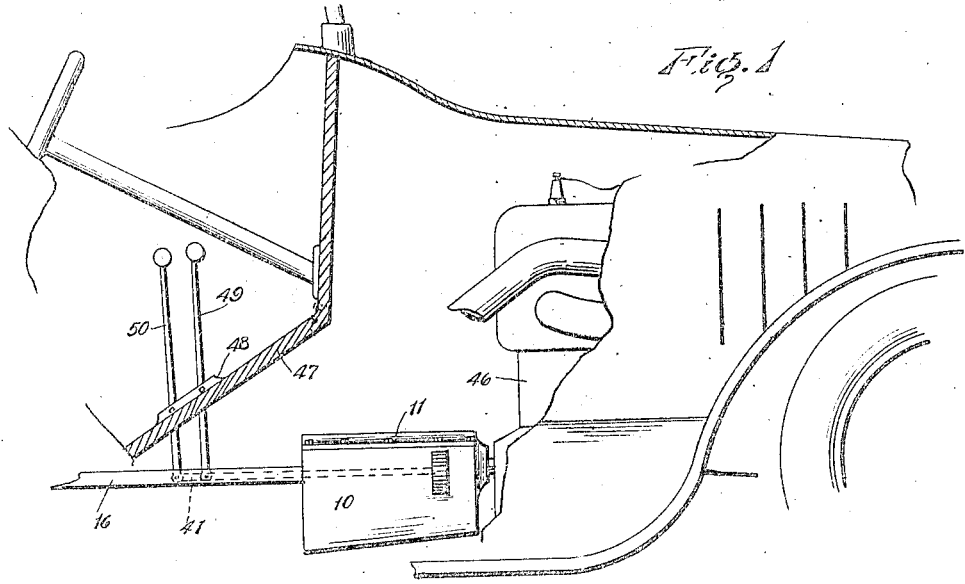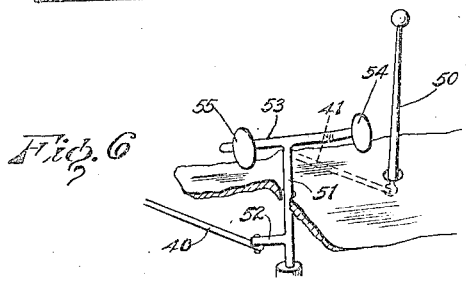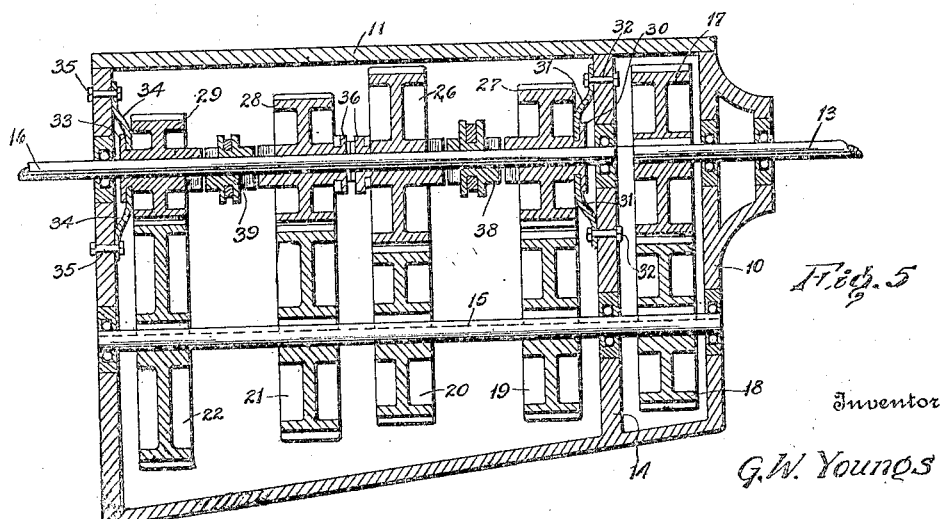

1,433,866

UNITED STATES PATENT OFFICE.

GEORGE W. YOUNGS, OF GREENWOOD, WISCONSIN.

TRANSMISSION GEARING.

Application filed October 16, 1920. Serial No. 417,336.

*To all whom it may concern:*

Be it known that I, GEORGE W. YOUNGS, a citizen of the United States, residing at Greenwood, in the county of Clark and State of Wisconsin, have invented certain new and useful Improvements in Transmission Gearing, of which the following is a specification.

This invention relates to an improved transmission gearing for motor vehicles and has as one of its principal objects to provide a gearing wherein clashing of the gears will be eliminated when changing from one speed to another.

A further object of the invention is to provide a gearing wherein all of the gears will be constantly in mesh.

And the invention has as a still further object to provide a gearing which may be readily employed in connection with substantially any conventional design of motor vehicle.

Other and incidental objects will appear hereinafter.

In the drawings:

Figure 1 is a side elevation showing my improved gearing upon a motor vehicle of conventional design, parts being broken away and shown in section, Figure 2 is a side elevation, the gear case being shown in section, Figure 3 is a plan view, the cover of the gear case being removed, Figure 4 is a transverse section on the line 4—4 of Figure 3, looking in the direction of the arrows, Figure 5 is a vertical sectional view of the gearing, and Figure 6 is a fragmentary side elevation showing a slightly modified form of control mechanism for the gearing.

Referring now more particularly to the drawings, I employ a gear case 10 normally closed by a cover 11 and formed on the forward end of the case is a hollow boss 12 through which is journaled a power shaft 13. Within the forward end portion of the case is a partition 14 and extending from end to end of the case is a counter-shaft 15 journaled through said partition as well as upon the end walls of the case. Journaled at its forward end upon the partition and extending through the rear end wall of the case is a driven shaft 16 arranged above and parallel to the counter-shaft, the driven shaft being also journaled upon said end wall. Fixed to the power shaft is a drive gear 17 and fixed to the counter-shaft are gears 18, 19, 20, 21 and 22. The gear 17 meshes with the gear 18. Rising from the bottom wall of the case is a post 23 and journaled at one end upon said post and at its opposite end upon the partition 14, is a shaft 24 upon which is fixed a reverse gear 25 constantly in mesh with the gear 19. Freely mounted upon the counter-shaft at its forward end portion are gears 26 and 27 respectively, and freely mounted upon said shaft at the rear of the gear 26 are gears 28 and 29. The gear 26 is the low speed gear while the gear 27 is the reverse gear. The gear 28 is the second speed gear, while the gear 29 is the high speed gear. At its forward end the hub of the gear 27 is formed with a grooved extension 30 and engaging in the groove of the extension are mating forks 31 projecting above and below the counter-shaft. As best shown in Figure 5 of the drawings, these forks are curved to extend away from the partition 14 and securing the forks to the partition are bolts or other suitable fastening devices 32. The forks will thus serve to hold the gear 27 against endwise movement. At its rear end, the gear 29 is formed with a grooved extension 33 similar to the extension 30 of the gear 27 and engaging in the groove of the extension 33 are mating forks 34 corresponding to the forks 31. The forks 34 are secured to the rear end wall of the gear case by bolts or other suitable fastening devices 35 so that the forks will thus serve to hold the gear 29 away from said end wall as well as against endwise movement. At their confronting ends, the hubs of the gears 26 and 28 are formed with grooved extensions 36 and engaging in the grooves of said extensions are mating compound forks 37 bolted or otherwise secured at their outer ends to the side walls of the gear case. Thus, these forks will hold the gears 26 and 28 against endwise movement.

Splined upon the driven shaft 16 between the gears 26 and 27 is a clutch collar 38 provided at its ends with lugs adapted to mate with similar lugs upon the confronting ends of the hubs of said gears. Splined upon the counter-shaft between the gears 28 and 29 is a similar clutch collar 39 which, like the collar 38, is provided at its ends with lugs adapted to mate with similar lugs upon the confronting ends of said gears. Slidable through the rear end wall of the gear case are rods 40 and 41 provided with forks 42 and 43, the fork 42 coacting with the collar 38 and the fork 43 coacting with the collar 39. In Figure 1, I have shown my improved transmission gearing in connection with a motor vehicle of conventional design. The engine of the vehicle is indicated at 46 and the floor at 47. As will be observed, the gearing is arranged in rear of the engine and is suitably supported upon the frame of the chassis so that the power shaft may extend from the engine into the gear case. Mounted upon the floor 47 of the vehicle is a base plate 48 and pivoted upon this plate are control levers 49 and 50 respectively. At its lower end the lever 49 is pivotally connected to the rod 40 while the lever 50 is pivotally connected at its lower end to the rod 41. Thus, as will be seen, the lever 49 may be rocked rearwardly for shifting the collar 38 into engagement with the gear 26 when this gear will be coupled to the counter-shaft 16 for giving low speed. On the other hand, by shifting the lever 49 forwardly, the collar 48 will be moved to engage the gear 27. This gear will then be coupled with the counter-shaft for giving reverse. Similarly, the lever 50 may be rocked forwardly for shifting the collar 39 into engagement with the gear 28 for giving second speed while when said lever is rocked rearwardly, the collar 39 will be moved into engagement with the gear 29 for giving high speed. As will be noted, all of the gears are constantly in mesh and clashing of the gears will, when shifting from one speed to another, be accordingly eliminated.

In Figure 6 of the drawings, I have shown a slight modification of the invention which relates particularly to the control mechanism employed for shifting the collars 38 and 39. In this modification, the lever 50 is retained while, in lieu of the lever 49, a shaft 51 is employed. This shaft is suitably journaled to rock about a vertical axis and extending from the shaft is an arm 52 to which is pivotally connected the rear end of the rod 40. At its upper end the shaft is formed with a cross head 53 and supported by said head are pedals 54 and 55 respectively. By pushing upon the pedal 54, the collar 38 may be shifted rearwardly for giving low speed while by pushing upon the pedal 55 the collar may be shifted forwardly for giving reverse.

Having thus described the invention, what is claimed as new is:

1. A transmission gearing including a gear case having a partition extending from side to side thereof bracing the gear case, shafts journaled upon the case comprising a power shaft, a driven shaft and a counter-shaft having gear connection with the power shaft, gears fixed upon the counter-shaft, gears loose upon the driven shaft constantly meshing with the gears of the counter-shaft, means secured to the partition holding one of the gears of the driven shaft against endwise movement, means secured to the walls of the gear case holding the other of the gears of the driven shaft against endwise movement, and clutch elements mounted upon the driven-shaft to turn therewith and slidable upon said shaft to selectively engage the gears thereon.

2. A transmission gearing including a gear case having a partition extending from side to side thereof bracing the gear case, shafts journaled thereon comprising a power shaft, a driven shaft and a counter-shaft having gear connection with the power shaft, gears fixed on the counter-shaft, gears loose on the driven shaft meshing with the gears of the counter-shaft, a fork secured to the partition and engaging one of the gears of the driven shaft for holding said gear against endwise movement, other forks secured to the gear case and engaging the other of the gears of the driven shaft for holding said other gears against endwise movement, and clutch elements mounted upon the driven-shaft to turn therewith and slidable upon said shaft to selectively engage the gears thereon.

3. In a transmission gearing, the combination of a gear case having a partition extending from side to side thereof bracing the gear case, a power shaft extending through one end of the gear case terminating short of said partition, a driven shaft extending through the opposite end of the gear case and journaled at one end upon the partition, a countershaft extending through the partition and journaled at its ends upon the ends of the case as well as upon said partition, a gear connection between the power shaft and the countershaft, gears fixed on the countershaft, gears loose on the driven shaft constantly meshing with the gears of the countershaft, stationary means coacting with the hubs of the gears of the driven shaft holding such gears against endwise movement, one of such means being carried by said partition, and clutch elements mounted upon the driven shaft to turn therewith but slidable upon said shaft to selectively engage the gears thereof.

In testimony whereof I affix my signature.

GEORGE W. YOUNGS. [L. S.]